United States Patent [19]

Eickmann

[11] Patent Number: 4,923,144

[45] Date of Patent: May 8, 1990

[54] AIRCRAFT WITH PIVOTABLE WING AND ARRESTABLE PROPELLERS

[76] Inventor: Karl Eickmann, 2420 Isshiki, Hayama-machi, Kanagawa-ken, Japan

[21] Appl. No.: 92,823

[22] Filed: Sep. 3, 1987

[51] Int. Cl.$^5$ .............................................. B64C 29/00
[52] U.S. Cl. ........................... 244/7 R; 244/7 C; 244/48
[58] Field of Search ............... 244/6, 7 R, 7 B, 7 C, 244/17.23, 8, 48

[56] References Cited

U.S. PATENT DOCUMENTS

| | | | |
|---|---|---|---|
| 1,842,250 | 1/1932 | De Bobrovsky | 244/6 |
| 1,877,902 | 9/1932 | Kuethe | 244/6 |
| 2,048,950 | 7/1936 | Roepke | 244/6 |
| 2,514,639 | 7/1950 | Haack | 244/56 |
| 2,514,822 | 7/1950 | Wolfe, Jr. | 244/17.11 |
| 2,580,312 | 12/1951 | Moore | 244/7 C |
| 2,959,373 | 11/1960 | Zuck | 244/48 |
| 2,987,272 | 6/1961 | Vogt | 244/17.23 |
| 3,149,800 | 9/1964 | Sinter et al. | 244/7 R |
| 3,185,410 | 5/1965 | Smart | 244/17.23 |
| 3,241,791 | 3/1966 | Piusecki | 244/6 |
| 3,389,878 | 6/1968 | Westrup | 244/7 R |
| 3,409,248 | 11/1968 | Bryan | 244/6 |

Primary Examiner—Galen Barefoot

[57] ABSTRACT

The invention provides an aircraft with propellers with vertical and horizontal axes in combination with pivotable wing portions. At vertical take off and landing the propellers with vertical axes bear the craft while the wing portions are set with their chord parallel to the airstreams through the lifting propellers. When the aircraft flies forward with enough speed, driven by the propeller(s) with the horizontal axis (axes), the lift propellers are set to rest parallel to the forward flight direction of the craft while the wing portions then pivot under the airflow over them into a horizontal position with their chords, at which they are prevented from further pivoting by stoppers in order that the wing portions then carry the craft at the forward flight. The actions of the lift propellers and the wing portions can be effected by power division means between the propellers with vertical and horizontal axes with the result that the wing portions adjust their positions automatically according to the flight behavior of the craft.

10 Claims, 4 Drawing Sheets

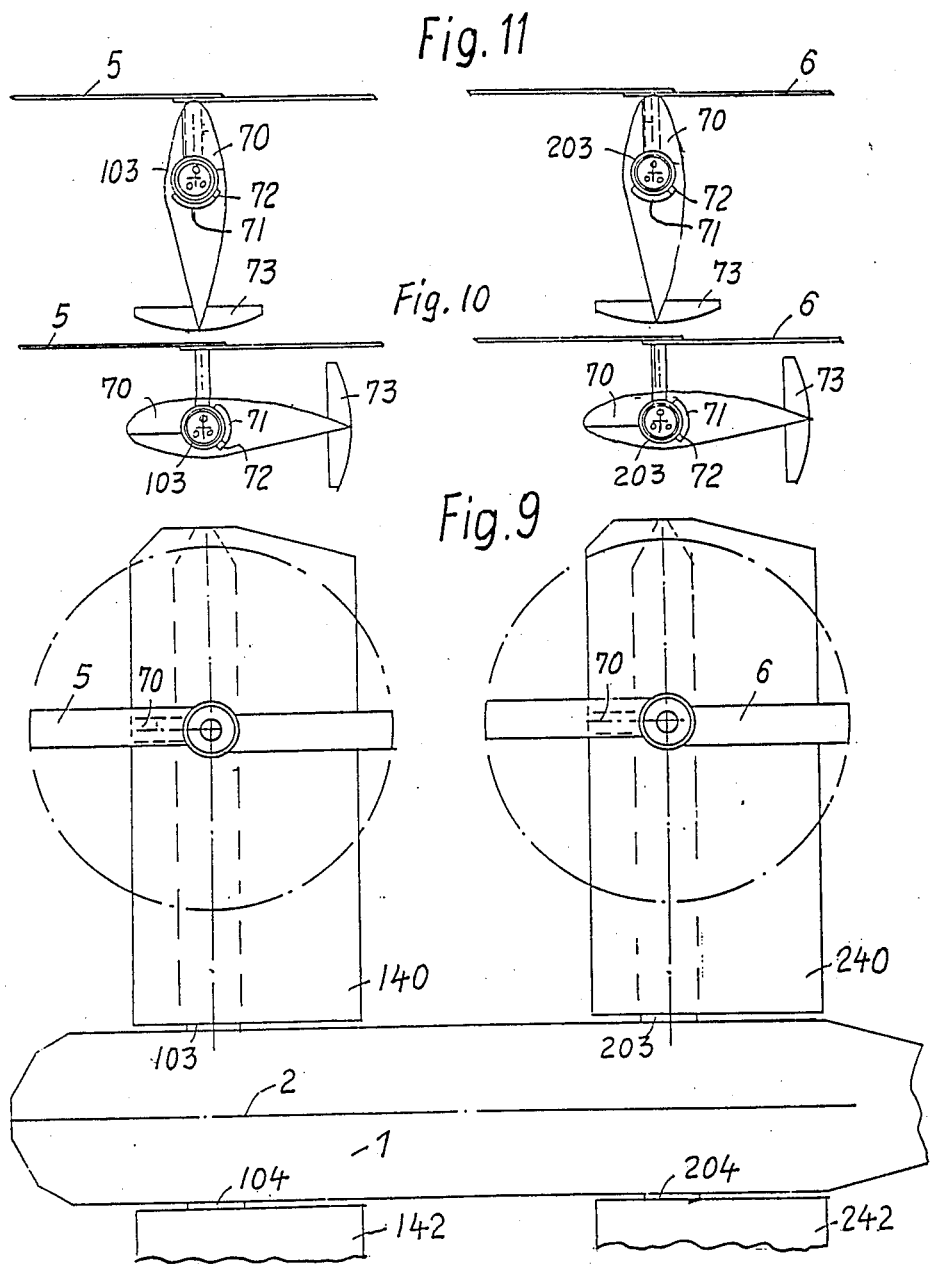

AIRCRAFT WITH PIVOTABLE WING AND ARRESTABLE PROPELLERS

FIELD OF THE INVENTION

This invention relates to aircraft with abilities for vertical and horizontal flight.

DESCRIPTION OF THE PRIOR ART

Some patents of the prior art show aircraft with pivotable wings and stoppable propellers. For example, the De Bobrovsky reference No. 1,842,250 shows wing portions to the right and left of the fuselage which can be pivoted with manual control by the pilot from vertical to horizontal and vice versa positions. This patent also shows annular portions as spars in the wing portions.

The Moore patent No. 2,580,312 shows three bladed propellers which can be set in rest with one of the blades parallel to the direction of flight and the two other blades angularly set to rest between the forward and side-ward directions.

In these patents of the prior art the wing portions do, however, not adjust their angles of attack automatically but need a pilot's controlling action. The two of the three bladed propeller blades cause high drag at forward flight because they re not with their lengths directed parallel to the direction of flight.

The Vogt patent No. 2,987,272 provides four three bladed propellers on in the direction of flight from medial holding means extended holding arms, but no self directing wings and no two bladed propellers set in rest in the direction of flight.

All these patents of the former art thereby fail to obtain the aims of the present invention. They therefore require improvements which are done by the present invention, to make the wing portion self directing from vertical to horizontal and vice versa direction to safe the pilot from controlling procedures. They also need improvements by the present invention to set two bladed propellers in rest with their longitudinal extensions set parallel to the direction of flight to reduce the drag to a minimum at high speed forward flight.

SUMMARY OF THE INVENTION

The aim and object of the invention is to provide an aircraft with the ability for vertical take off and landing as well as for forward flight with inexpensive and reliable means.

A further object of the invention is to let a number of functions be carried out automatically by subjecting means of the craft to air-streams in order to make the piloting of the craft easy and in order to prevent accidents by pilot errors.

A still further object of the invention is to set the lifting propellers at forward flight into the position of lowest drag in order to make an economic forward flight on wings possible without retracting the lifting propellers into the craft.

BRIEF DESCRIPTION OF THE DRAWINGS

FIG. 1 and 9 show aircraft of the invention seen from above.

FIGS. 2, 10 and 11 shows the respective craft seen from the side. And,

DESCRIPTION OF THE PREFERRED EMBODIMENTS

Figure 1:
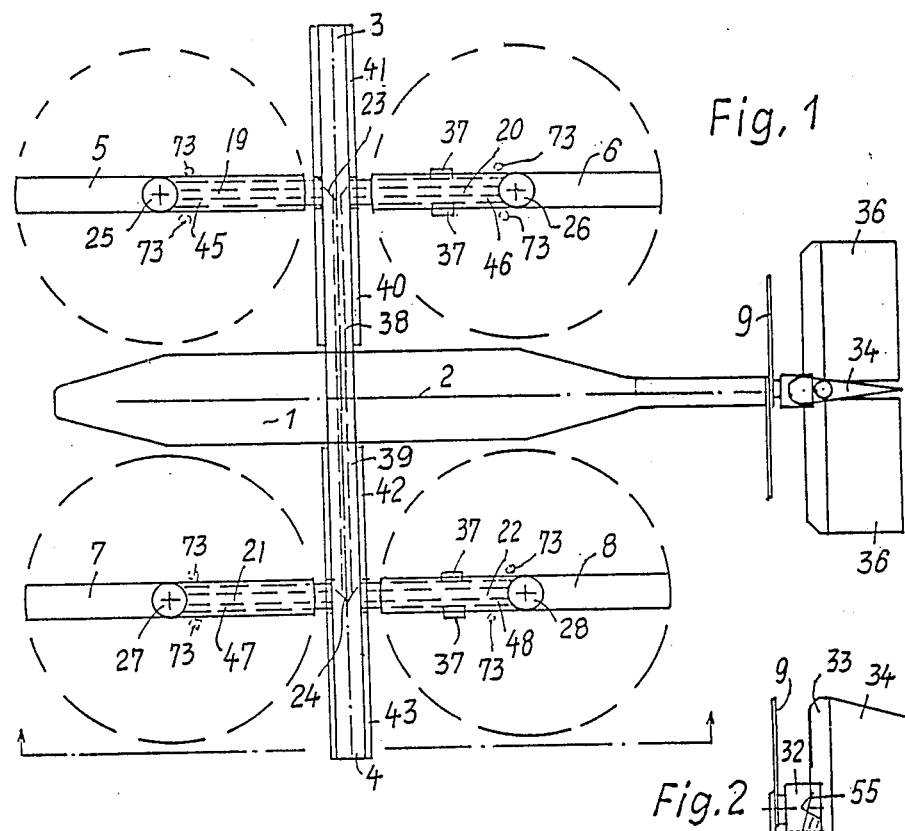
Figure 2:
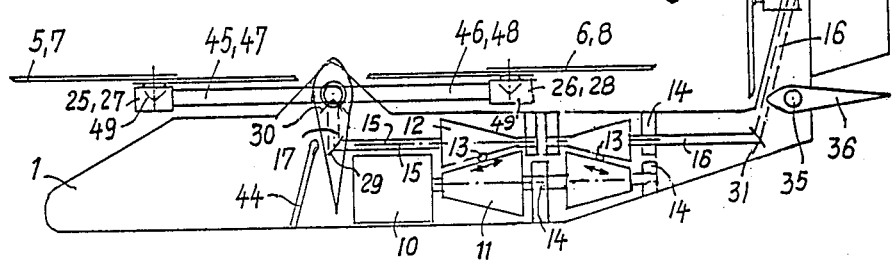

In FIGS. 1 and 2 the body 1 is symmetrically formed about the longitudinal medial vertical plane 2. Laterally relative to the body and the mentioned plane extend holding arrangements 3 and 4 which at least partially or locally are provided with annularly shaped ring portions with a cylindrical outer face 50. Wing portions 40 to 43 have hollow inner cylindrical portions which fit around the cylindrical annular portions of the holding means whereby the wing portions can pivot or swing around the axes of the cylindrical portions of the holding arrangements 3 and 4. Stoppers 37 are provided to limit the extent of the pivotal moveability of the wing portions. Laterally offset from the body, the holding arrangements 3 and 4 are provided with forward and rearward extending propeller holding arms 45 to 48. These holding arms extend parallel to the medial axis of the longitudinal plane 2. The forward and rearward extending propeller holding arms are preferred to be symmetrical relative to the holding arrangements 3 and 4, whereby they are also symmetric to the mentioned longitudinal plane 2 and to body 1. On the tips of the holding arms are propeller shaft bearing holders 25 to 28 provided, respectively, to carry therein revolvably the shafts of lifting propellers 5,6,7 and 8, respectively. The holding arrangements 3,4 as well as the propeller holding arms 45 to 58, are preferred to be hollow in order that propeller driving transmission portions can be provided through their interiors to the shafts of the propellers to drive the lifting propellers around their vertical axes. Such transmission portions are respectively shown by referentials 38,39,19,20,21,22 and angular gearing means 49,23,24,30 may be provided to them if not a hydrostatic transmission is provided.

Power plant 10 is in this embodiment located in the body 1 and is connected to a power divion means 11,12,13. This power division means is able to vary the portions of power which shall be transferred from the power plant either to the propeller 9 with the horizontal axis or to the lift propellers 5 to 8 with their vertical axes. To effect the variation of the rates of power the variable adjustment controller 13 is provided. In order to make this easily understood the controller 13 is in FIG. 2 a friction taking ball which can be moved in the directions of the arrows below ball 13. By moving the controller in the direction of the arrows, the respective shaft 15 to the vertical propellers or shaft 16 revolves either faster or slower. Note that there are two such controllers 13, one between the tapered cones of the power plant to the shaft 15 and the other to the shaft 16. The shafts or rotary bars 15 and 16 as well as the other rotary members may be supported in bearings 14. Shaft 15 is independent of shaft 16, which means, that both can revolve with different or no rotary angular velocities, depending on the locations of controller balls 13. Shaft 15 goes to a tapered gear 29 to transfer its rotary power to the upgoing shaft(s) 17 to meet again with a taper gear 30 the internal transmission shafts 38 and 39 in the interiors of the holding arrangements 3 and 4 wherein they are revolvably borne. Taper gears 23 and 24 transfer the rotary power from shafts 38,39 to the shafts 19,20,21, 22 in the propeller holding arms to meet the tapered gears 49 for the transfer of the rotary power to the propellers 5,6,7,8, whereby these four propellers are revolved with equal rotary angular velocities, however, with different rotary directions between neighboring propellers. Shaft 16 goes to the gear 31 to transfer the rotary power portion to the upwards going shaft portion 16 and from there over the gear 55 to the shaft of the forward driving propeller 9 with the substantially horizontal axis.

Seat 44 indicates the seat of the pilot. The side rudder 33,34 and the up-down inclination rudder 36, swingable around bearing 35, are also provided on the body of the aircraft.

Figures 3, 4:
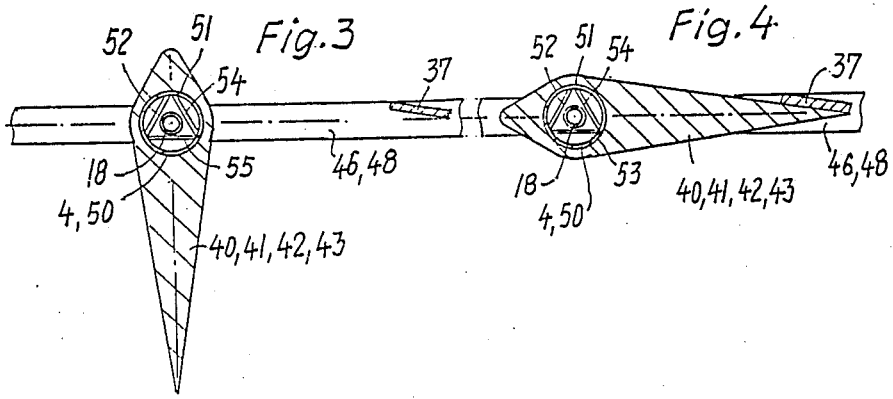
FIGS. 3 to 8 show sectional arrangements through portions of the aircraft of the invention.

For vertical take off the speed ratio controllers 13 let the propellers with the vertical axes obtain all or almost all power of the power plant 10. At forward flight all power of plant 10 may be sent to propeller 9 with the horizontal axis to drive the craft forward with speed. In the range therebetween the ratios of power from plant 10 will vary from one of the both extremes to the other. At vertical take off the wing portions hang downward with their rear edges as indicated in FIG. 3. At forward flight the airstream from the front of the aircraft causes the wing portions to swing (pivot) into the horizontal position of FIG. 4. Seen in FIG. 4 and 1 are the pivotal movement stoppers 37 which may be fastened in the propeller bearing arms 46 and 48, They stop further pivotal movement of the wing portions 40 to 43 by letting the wing portions run against the stopper 37. The wing portions are then arrested in the direction of FIG. 4 and the aircraft is then borne by the wings, while the lifting propellers 5,6,7,8 with the vertical axes are set to rest in the directions as indicated in FIG. 1 which shows the aircraft of this embodiment of the invention seen from above.

FIGS. 3 and 4 also indicate that substantial triangular arrangements 52,53,54 may be provided inside of the cylindrical annular portion 50 of the holding arrangements 3 and 4 to strengthen the capabilities of the holder arrangements 3 and 4 and to carry on the cylindrical annular portions 80 the hollow circular face portions 51 of the wing portions for the pivotable bearing and location. FIG. 3 and 4 show also the mentioned stoppers 37 in their locations relative to the wing portions and the propeller holding arms 46,48. These Figures show also the transmission portions (hollow shafts, pipes) 18 inside of the holding arrangement(s) 3 or 4. The pipes are partially used as fluid lines if a fluid power transmission is applied.

Figure 5:
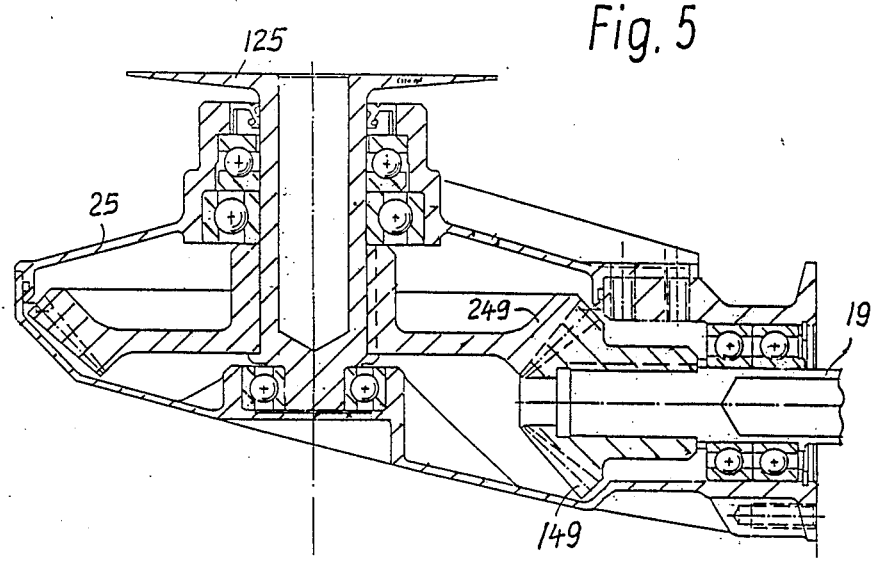

FIG. 5 illustrates the interior arrangement of the gear and propeller arrangement 25 of FIGS. 1 and 2. The transmission portion 19 (here a pipe) carries ingoing taper gear 149 to mesh with the thereby driven taper gear 249 of the shaft of the propeller. A reduction of rotary speed is incorporate by gears 149 and 249. The shaft of the propeller has a flange 125 to bolt the propeller 5 onto this flange. Similar arrangements are provided to propellers 6,7 and 8 with respective ingoing transmission portions 20,21 and 22.

Figure 6:
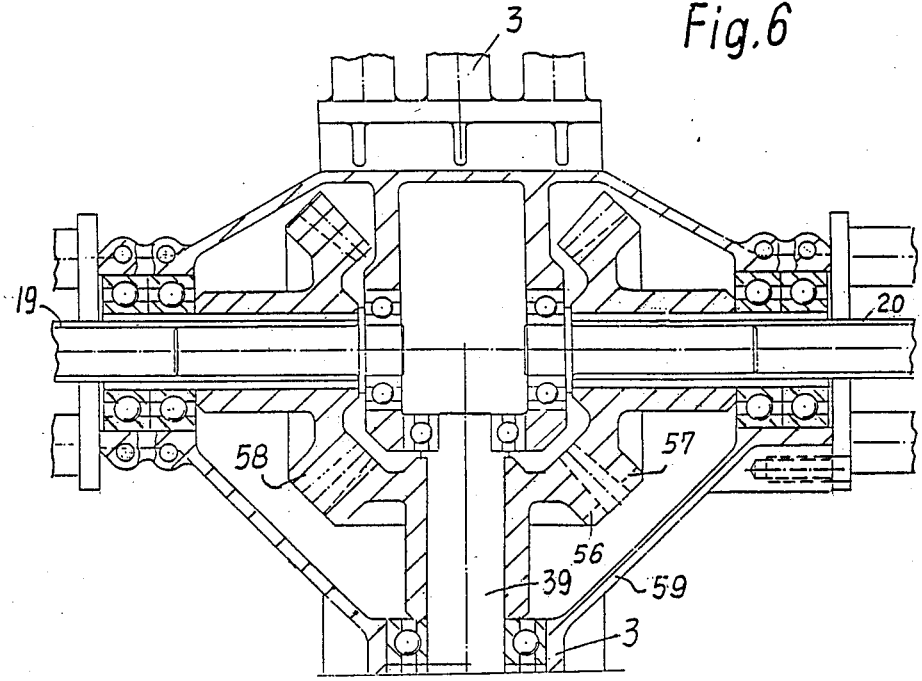

FIG. 6 shows the interior of the gear between a respective transmission portion of the holding arrangement and transmission portions of the propeller holding arms. Transmission portion 39 of the holding arrangement carries taper gear 56 to drive by it the taper gears 57 and 58 which are fastened to transmission portions 19 and 20 of propeller holding arms, respectively, with counter directional rotary velocities. Holding arrangement portions are partially shown in this Figure by the numeral 3.

Figure 7:
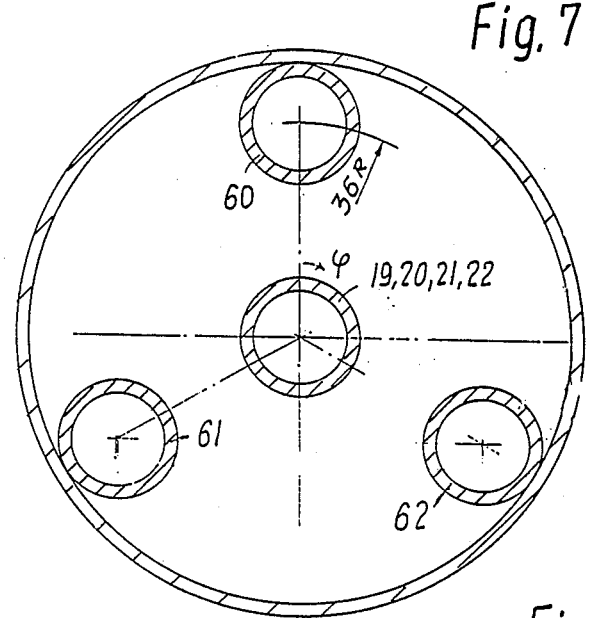
Figure 8:
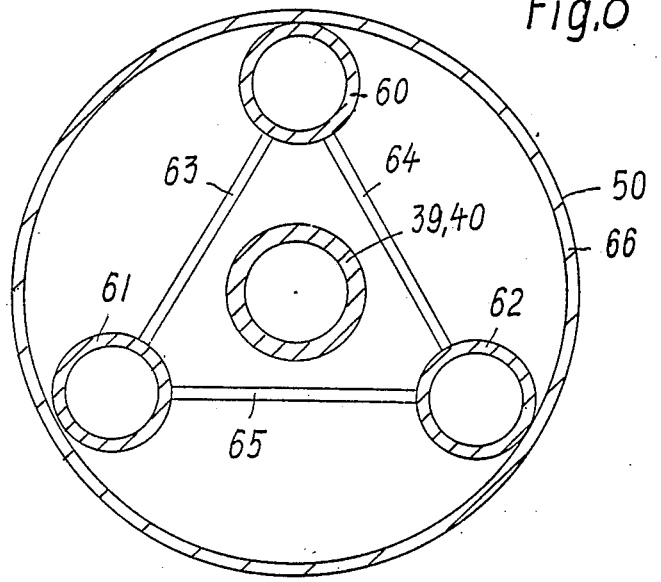

FIGS. 7 and 8 show cross sectional views through portions of the mentioned holding arrangements in a preferred style. These Figures are in scale for a 150 horsepower one person aircraft with four lift propellers 5 to 8 of about 2 meter diameter each for a lifting capacity of 400 to 550 kilogram total lift. FIG. 6 shows the propeller arm sectional view and shows that the arm is built by three pipes of about 20 mm outer diameter and 2 mm wall thickness with the axes of the pipes in the corners of an even triangle. This arrangement of this three pipes gives the greatest strength at smallest weight. The medial fourth pipe is the reloving transmission portion 19,20,21 or 22. FIG. 7 shows the cross section of the holding arrangement. Note that the holding arrangement is the expression for the main holding arrangement which holds the wing portions and the propeller holding arms. Since the power going through the medial pipe 39,40, is now twice that of FIG. 6, the transmission portion 39 or 40 is a pipe of slightly bigger diameter and wall thickness. The triangularly arranged pipes 60 to 63 are arranged as in FIG. 6 and give again the greatest strength to the holding arrangement at lowest weight. Since this holding arrangement has to carry more than a respective propeller holding arm, thin plates 63 to 65 are welded between the pipes 60 to 62. At those locations of the axial length of the holding arrangement 3,4 where the wing portions are pivotable borne, the annular ring portion 66 with the circular cylindrical outer face 50 is provided. This exists, however, only there, where a face 51 of a wing portion 40,41,42 or 43 is pivotably borne on face 50 of ring 66. If this ring 66 would extend over the entire length of the holding arrangement, the aircraft would become too heavy and would be unable to lift vertically with a small 100 to 150 horsepower power plant. .

FIGS. 9 to 11 illustrate that the aircraft can instead of having a single holding arrangement extending laterally to one side from the body 1, a plurality of such holding arrangements may be provided. In FIG. 9 four such arrangements are shown, each two extending to the same side from the body, namely arrangements 103,203 to the right and 104,204 to the left from body 1. Note that FIG. 9 shows this embodiment of an aircraft of the invention seen from above. FIG. 11 then shows the craft seen from the side with the wing portions in vertical take off or landing position while FIG. 10 shows them in horizontal forward speedy flight position. The wing portions 140, 240, 142 and 242 are one piece portions in these Figures. To make the pivoting of them possible, there are slots 70 provided through which the propeller holding portions extend. The arresting =stopping of the wing portions is in these Figures not externally, but internally accomplished. The wing portions have parts circular slots 71 and the holding arrangement has stoppers 72 which extend into the slots 71. The ends of the slots 71 are formed by wall portions against which the stoppers 72 bear in the both extremities of pivoting locations of the wing portions. The lift propellers are shown in forward flight position. Dotted lines in the Figures show the outer diameters of the propeller circles of the lift propellers. In FIGS. 11 and 10 the rear ends of the wing portions carry floats 73 for landing and running on the surface of water and they serve as airstream guides in horizontal flight. Stoppers 73 are indicated in FIG. 1 by way of example, in dotted lines, to indicate the possibility of setting propeller arresters for the horizontal flight. They may be moved upwards from the propeller holding arms for arresting of the lifting propellers 5,6,7,8 while they may retract downwards for the freeing of the lifting propellers for their revolving at lifting.

By the invention the time for the retraction and extension of propellers is spared. The pilot is freed from the attention to the retraction and extension of the lift propellers. And, very important, the lift propellers are immediately available without losing time for their extension from containing compartments in case of need. Thus, the craft of the invention is ready for immediate use of lift propellers if such need or desire arises during forward flight. The disadvantage is a slight drag caused by the propellers. This drag is, however, acceptable for short distance flights with moderate speed of a few hundreds of kilometers per hour. The craft in its present form is thereby specifically suitable for personal use instead of a car. It is small in dimensions and lifts vertically at smaller space than common helicopters do. The four lift rotors lift at the same ower 1.59 times of that which a single propeller of equal dimension would lift at the same power consumption.

The invention is described with mechanic transmissions between the power plant and the propellers. But, instead of a single power plant, separeated power plants may be used fo the lift and the forward driving propeller(s). Especially the mechanic transmission may be replaced by hydrostatic transmission of the inventor's patents. The mechanic transmission is easy understood, but it is heavier than a hydrostatic transmission of the inventor's patents. It has a better efficiency in the taper gears, but the variable mechanic transmissions are critical in nature. If they shall be effective and reliable then they are rather heavy. The gears meet only in lines which has as the rest that the gears are either very heavy or of short lift time only. Their efficiency is slightly better than that of hydraulic pumps and motors, but their heavier weight, the relative unreliability of mechanic variable transmission portions, as well as the bigger dimensions which cause more drag, reduce the superiority of mechanic transmissions over the hydrostatic transmission of the inventor's pumps and motors. It should therefore be understood, that also mechanic transmissions have been illustrated, their replacement by hydrostatic transmissions is within the scope of the present invention and its claims. Of importance is also that the lift propellers with their high power requirement are only very short times used at start and landing, while the craft mainly flies on its wing portions as an ordinary aircraft does. The invention thereby provides an aircraft with an ability for emergency landing on wings. Since the invention is more in details described in the claims, the claims are considered to be a portion of the description of the embodiments and of the invention.

What is claimed, is:

1. An aircraft for vertical and horizontal movement through air,
    comprising, in combination,
    a body substantially symmetrically arranged about a medial longitudinal vertical plane with therefrom laterally extending holding arrangements with one of the arrangements extending to the left and the other to the right of said body, at least one power plant, transmission means between said power plant and propellers which are provided on said aircraft, directional control means for the control of the attitudes of the craft in the air, at least four propellers with substantially vertical axes at least one propeller with a substantial horizontal axis,
    and an improvement which includes at least one wing portion on each of said holding arrangements, forward and rearward from said holding arrangement extending propeller holding arms, propellers with substantial vertical axes provided on the tips of said arms, transmission means between said propellers of said arms and said power plant, a power supply means to said propeller with said substantial horizontal axis, pivot means including stopper means for the provision of a possibility to said wing portions for pivotal movement from a substantial vertical chord to a substantial horizontal chord, and vice versa,
    means to revolve and to stop said propellers with substantial vertical axes for setting them to rest with their longitudinal extensions in the direction of movement of said craft at horizontal forward flight, and said transmission including rotary angular velocity equalization means for said propellers with said substantial vertical axes.

2. The aircraft of claim 1,
    wherein said four propellers with said substantially vertical axes are two-bladed propellers with from their centers in opposed directions extending propeller-blades,
    wherein said holding arrangement extends about a laterally extending axis which extends in perpendicular directions through said medial vertical plane of said body,
    wherein said propeller holding arms are provided between the right and left- tips of said holding arrangement but medialwardly distanced from said left- and right- tips.
    wherein the axes of said forward and rearward extending holding arms of said to the right from said body extending holding arrangement form a first single axis parallel to the longitudinal axis of said body, while the axes of said forward and rearward extending holding arms of said to the left of said body extending holding arrangement form a second single axis parallel to said longitudinal axis of said body with said first and second single axes symmetrically located respective to said medial longitudinal vertical plane of said body and,
    wherein the axes of said propeller blades extend parallel to said first and second single axes when said four propellers are stopped.

3. The aircraft of claim 2,
    wherein said means to stop said propellers are provided on said propeller holding arms.

4. The aircraft of claim 3,
    wherein said means to stop said propellers are provided with arresting portions which are extendable from said propeller holding arms and retractable towards said propeller holding arms to arrest and to free said four propellers.

5. The aircraft of claim 2,
    wherein said wing portions extend in lateral directions relative to said medial longitudinal vertical plane of said body beyond said propeller holding arms.

6. The aircraft of claim 2, p1 wherein said stopper means to stop said wing portions at the substantial horizontal direction of their chords are provided on said propeller holding arms to meet respective face portions of said wing portions at their situation of said substantially horizontally directed chords of said wing portions.

7. An aircraft, comprising, in combination, a power plant and a transmission to transfer the power of said
power plant from said plant to a plurality of propellers,
at least one forward driving propeller with a substantially horizontal axis to drive said aircraft forward at substantially horizontal flight and at least two lifting propellers with substantially vertical axes provided laterally of the body of said aircraft with said lifting propellers provided for hovering as well as for vertical take off and landing,
wherein said lifting propellers with their substantially vertical axes consist of two from the medial portions of the propellers in opposed directions extending propeller blades with said lifting propellers provided with means to set them to rest with their longitudinal extensions parallel to the direction of the horizontal flight of said aircraft,
wherein holding means are provided to extend in both directions laterally from the body of said aircraft,
wherein wing portions are pivotably provided on said holding means with a pivotal movement enabling provision to let the chords of said wing portions set themselves substantially vertically at vertical take off, landing and hovering, while setting themselves substantially horizontally at forward flight of said aircraft to carry said aircraft at forward flight on said wing portions,
wherein said wing portions are provided with interior spaces which are boardered by interior annular bearing faces,
wherein said holding means are provided with cylindrical outer faces which meet said interior bearing faces of said wing portions,
wherein said bearing faces are capable of pivotal movement along said cylindrical outer faces,
wherein transmission portions extend through said holding means with said transmission portions being pipes which revolve around the axes of said cylindrical bearing faces,
wherein said transmission includes a rate of power adjustment device for the stepless control of the rates of power to said propellers for the variation of the portions of power to the driving propeller(s) relative to said lift propellers,
wherein pivotal movement stoppers are provided at fixed locations in said aircraft,
wherein said wing portions are provided with stopper faces to meet said stoppers when the force of airflow pivots said wing portions into their horizontally directed positions of their chords, and,
wherein retractable and extendible propeller stoppers are provided on said aircraft to meet, hold, and release a respective blade of a respective propeller of said lifting propellers.

8. An aircraft, comprising, in combination,
a power plant and a transmission to transfer the power of said
power plant from said plant to a plurality of propellers, at least one forward driving propeller with a substantially horizontal axis to drive said aircraft forward at substantially horizontal flight and at least two lifting propellers with substantially vertical axes provided laterally of the body of said aircraft with said lifting propellers provided for hovering as well as for vertical take off and landing,
wherein said lifting propellers with their substantially vertical axes consist of two from the medial portions of the propellers in opposed directions extending propeller blades with said lifting propellers provided with means to set them to rest with their longitudinal flight of said aircraft.
wherein holding means are provided to extend in both directions laterally from the body of said aircraft,
wherein wing portions are pivotably provided on said holding means with a pivotal movement enabling provision to let the chords of said wing portions set themselves substantially vertically at vertical take off, landing and hovering, while setting themselves substantially horizontally at forward flight of said aircraft to carry said aircraft at forward flight on said wing portions, and,
wherein said holding means includes three substantially parallel pipes fastened relative to each other at the tips of an imagined triangle and a medial pipe, which constitutes a portion of said transmission, is located in the middle of said three pipes and parallel thereto, while said medial pipe is borne in bearings to permit the revolution thereof relative to said three pipes.

9. The aircraft of claim 8,
wherein said pivotal movement enabling provision includes stoppers (72) on at least one of said pipes for the meeting of end faces of recesses (71) of said wing portions at said substantial horizontal and vertical directions of said chords of said wing portions.

10. An aircraft, comprising, in combination,
a power plant and a transmission to transfer the power of said
power plant from said plant to a plurality of propellers, at least one forward driving propeller with a substantially horizontal axis to drive said aircraft forward at substantially horizontal flight and at least two lifting propellers with substantially vertical axes provided laterally of the body of said aircraft with said lifting propellers provided for hovering as well as for vertical take off and landing,
wherein said lifting propellers with their substantially vertical axes consist of two from the medial portions of the propellers in opposed directions extending propeller blades with said lifting propellers provided with means to set them to rest with their longitudinal extensions parallel to the direction of the horizontal flight of said aircraft,
wherein holding means are provided to extend in both directions laterally from the body of said aircraft,
wherein wing portions are pivotably provided on said holding means with a pivotal movement enabling provision to let the chords of said wing portions set themselves substantially vertically at vertical take off, landing and hovering, while setting themselves substantially horizontally at forward flight of said aircraft to carry said aircraft at forward flight on said wing portions, and,
wherein said pivotal movement enabling provision includes stoppers on said holding means for meeting of end faces of recesses inside of said wing portions when said wing portions are pivoted into said substantial horizontal and vertical directions of said chords of said wing portions.

* * * * *